United States Patent [19]

Reichel

[11] Patent Number: 4,922,447

[45] Date of Patent: May 1, 1990

[54] DEVICE FOR MEASURING THE DISTANCE TRAVELLED AND THE SPEED OF A RAIL VEHICLE

[75] Inventor: Friedbert Reichel, Stuttgart, Fed. Rep. of Germany

[73] Assignee: Alcatel N.V., Amsterdam, Netherlands

[21] Appl. No.: 917,345

[22] Filed: Oct. 9, 1986

[30] Foreign Application Priority Data

Oct. 9, 1985 [DE] Fed. Rep. of Germany ....... 3536019

[51] Int. Cl.$^5$ .................... G01C 22/62; G01P 3/54; B60T 8/32
[52] U.S. Cl. .................. 364/561; 364/565; 377/9; 377/19
[58] Field of Search ............... 364/561, 565, 424; 377/24.1, 24.2, 17, 9, 19; 33/141.5, 142, 142 R; 361/239, 240; 73/490

[56] References Cited

U.S. PATENT DOCUMENTS

| 3,304,434 | 2/1967 | Foster | 33/141.5 |
|---|---|---|---|
| 3,780,272 | 12/1973 | Rohner | 364/561 |
| 3,789,198 | 1/1974 | Henson et al. | 364/561 |
| 4,007,419 | 2/1977 | Jasmine | 377/24.1 |
| 4,050,295 | 9/1977 | Harvey | 364/442 |
| 4,086,532 | 4/1978 | Aronson et al. | 377/24.1 |
| 4,176,397 | 11/1979 | Crom et al. | 364/561 |
| 4,371,935 | 2/1983 | Yamaki | 364/561 |
| 4,371,940 | 2/1983 | Yamaki et al. | 364/561 |
| 4,532,710 | 8/1985 | Kinney et al. | 377/24.1 |

FOREIGN PATENT DOCUMENTS

3039265 6/1982 Fed. Rep. of Germany.

OTHER PUBLICATIONS

H. Uebel et al, "Geschwindigkeits-und Wegmessung für LZB-Fahrseuge", Eisenbahntechnische Rundschau, vol. 32, No. ½, pp. 63–66 (1983).

Primary Examiner—Parshotam S. Lall
Assistant Examiner—Ellis B. Ramirez
Attorney, Agent, or Firm—Christie, Parker & Hale

[57] ABSTRACT

A device for measuring the distance travelled by and the speed of a rail vehicle fitted with wheel-coupled distance-pulse generators is disclosed in which both distance and speed are calculated from the time distance between successive distance pulses, and in which the change in wheel diameter due to wheel wear is already taken into account in the measurement of the time distance between the distance pulses (distance-pulse intervals). To measure the distance-pulse intervals, clock pulses of reduced repetition rate are counted which are obtained by dividing basic clock pulses of high repetition rate in an adjustment divider (T1). The wheel diameter is taken into account by changing the division ratio of the adjustable divider by means of a coding switch (S1).

4 Claims, 2 Drawing Sheets

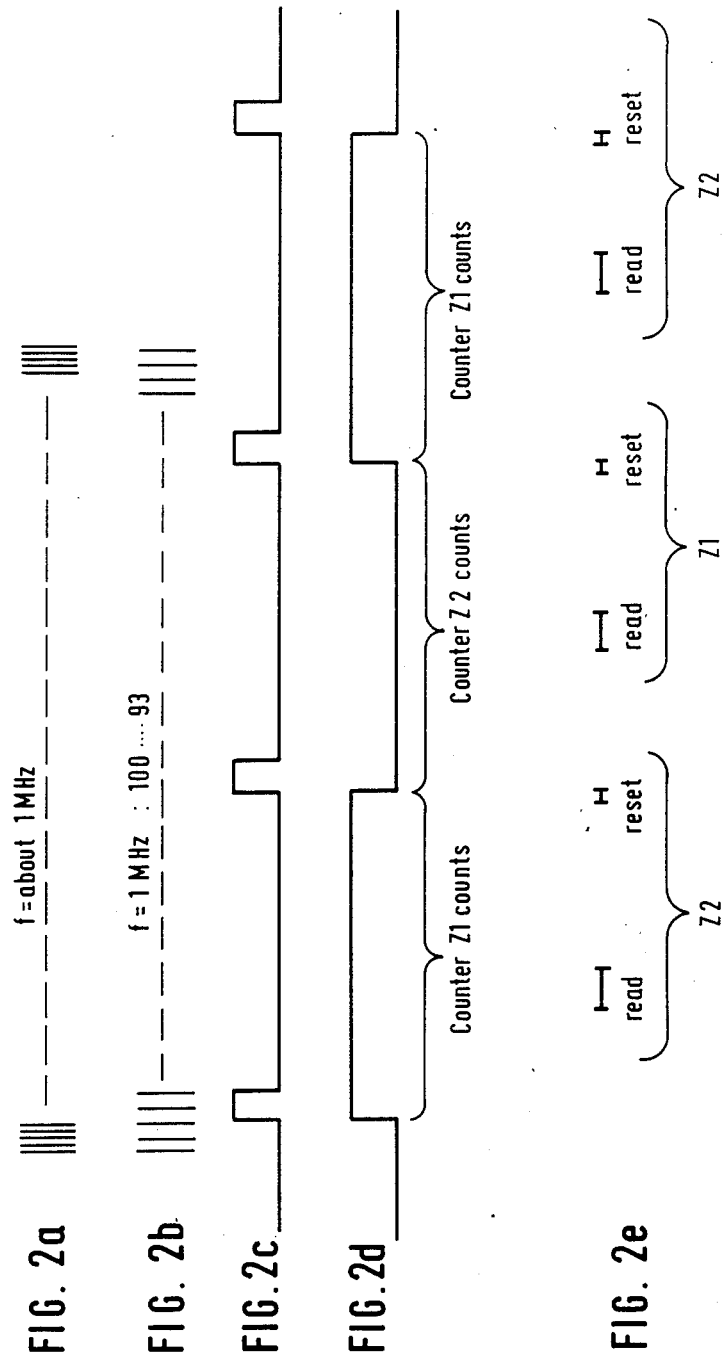

DEVICE FOR MEASURING THE DISTANCE TRAVELLED AND THE SPEED OF A RAIL VEHICLE

The present invention relates to an improved distance and speed-measuring device.

A prior art such device is described in an article by H. Uebel and U. Dräger published in "Eisenbahntechnische Rundschau" 32 (1983), No. 1/2, pp. 63 to 66.

The article describes the structure and operation of a distance- and speed-measuring system in which the previously used, rather inaccurate speed measurement involving the evaluation of the frequency of distance pulses from wheel-pulse generators is replaced by a more accurate period measurement.

The period measurement is performed in the above-cited prior art device by a microcomputer whose internal timer is triggered by the distance pulses from the wheel-pulse generator. On each interrupt caused by the trailing edge of a distance pulse, the count of the timer is read out and the timer is reset.

At slow speeds of the wheel, the period may become so long that the count capacity of the timer is not sufficient. In that case, an additional counter is necessary for registering the overflows of the timer. The calculation of speed from the counts of the timer is done by the computer. The wheel diameter required for the calculation, which may be up to 7% below an initial value due to wheel wear, is entered into the computer through a special input device.

The object of the present invention is to provide a distance- and speed-measuring device of the above kind which makes it possible to allow for wheel wear already during the period measurement and avoids errors caused by variations in the instants of the timer read-out operations.

Compared with the conventional device, the distance- and speed-measuring device in accordance with the invention has the advantage that, if the wheel diameter is precisely set, the number of pulses counted during a distance-pulse interval is the same for the same speed. The wheel diameter can be entered by means of a simple coding switch, and the need for a special entry into the computer, which is otherwise required prior to each train movement, is eliminated. Furthermore, for constant (interrogation) intervals, the sum of the changes of the two alternately used counters is independent of speed and only a function of the division ratio. This allows the evaluation computer to calculate the frequency of the clock pulses of reduced repetition rate and to perform a reverse calculation to determine the preset wheel wear; this can be used for checking purposes.

The presently preferred embodiment of the invention permits the measurement interval to be extended to two or more distance-pulse intervals in a simple manner. The device can thus be very well adapted to different distance-pulse generators commonly used on rail vehicles.

An embodiment of the device in accordance with the invention will now be described with reference to the accompanying drawings, in which:

FIGS. 2A–2E are pulse diagrams.

Figure 1:
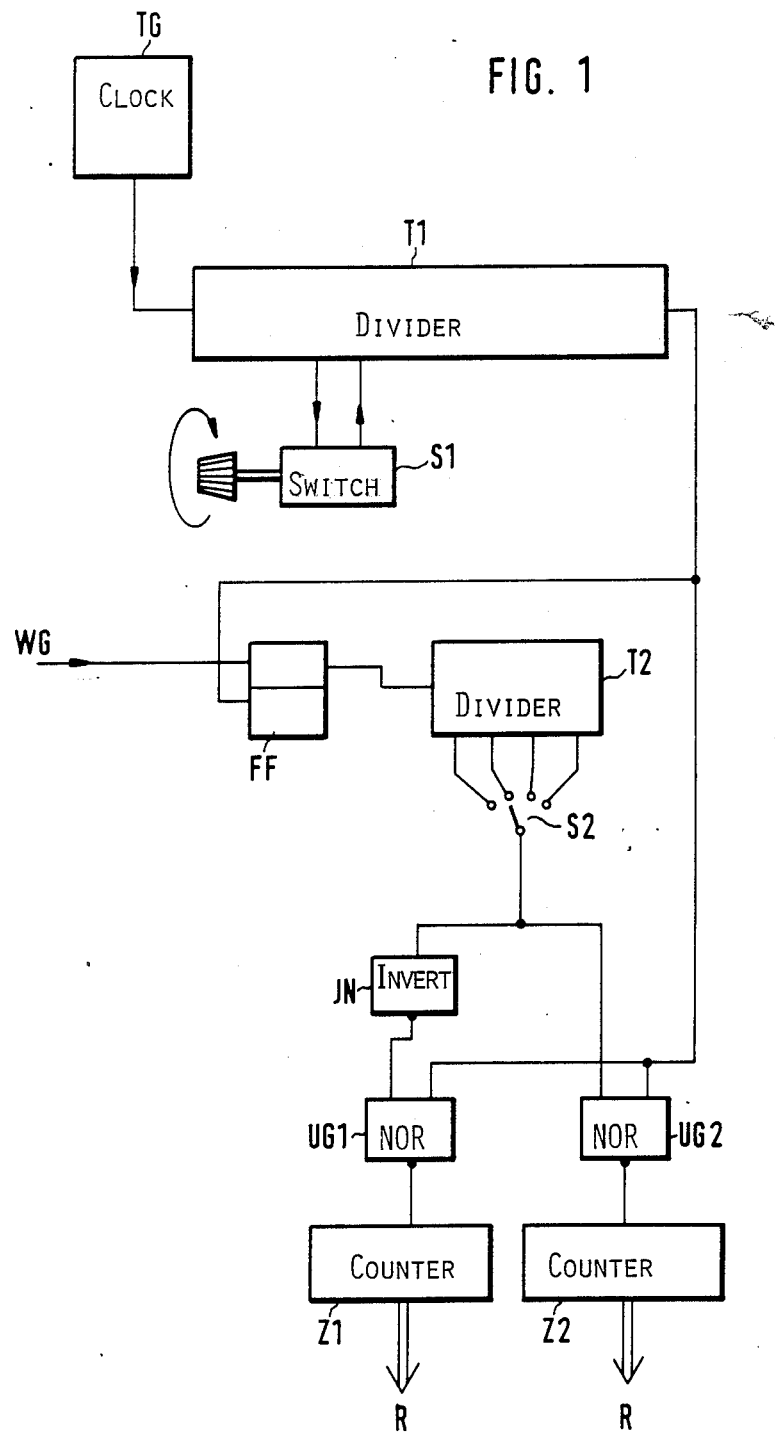
FIG. 1 is a block diagram of the device.

In FIG. 1, a clock generator TG provides clock pulses of a high repetition rate which are divided down in a following first divider T1. Via a coding switch S1, the division ratio can be changed so that the frequency of the pulses appearing at the divider output changes by up to 7%. For example, the division ratio can be reduced in steps from 100:1 to 93:1.

The pulse sequence appearing at the divider output is applied to two NOR gates UG1, UG2, which are controlled by distance pulses from a distance-pulse generator WG (not shown). The distance pulses are first synchronized with the clock pulses of reduced repetition rate by means of a D flip-flop FF and then applied simultaneously to the two NOR gates via a second divider T2 and a switch S2; the lead to one of the NOR gates, in this case the NOR gate UG1, contains an inverter IN.

The outputs of the NOR gates are coupled to counters Z1 and Z2, whose outputs are read by a computer R (not shown). This circuit ensures that, upon arrival of a distance pulse (which inhibits one of the gates and enables the other), the clock pulses of reduced repetition rate cannot be registered by both counters by mistake.

FIG. 2 is in the form of a pulse diagram. It shows schematically the pulse sequences at the output of the clock generator TG (FIG. 2a) and at the output of the divider T1 (FIG. 2b), the sequence of distance pulses (FIG. 2c), the sequence of distance-pulse intervals (FIG. 2d), and possible read and reset times for the counters Z1 and Z2 (FIG. 2e).

The clock pulses shown in FIG. 2a, which have a repetition rate on the order of 1 MHz and may also be provided, for example, by the clock generator of the computer R evaluating the counts, are divided by 93 . . . 100 in the divider T1, and are then available as count pulses (FIG. 2b) for the period measurement.

The period is determined by the time distance between the pulses of the pulse train from the distance-pulse generator (distance-pulse intervals), which is shown in FIG. 2c. These distance pulses, which are shown in FIG. 2c, are synchronized with the clock pulses of reduced repetition rate by the flip-flop FF. The distance-pulse intervals (FIG. 2d) are available at the output of the divider T2.

As the gates UG1 and UG2 are enabled alternately, the pulses arriving during successive distance-pulse intervals are counted alternately either by the counter Z1 or by the counter Z2. While the counter Z2 is counting, the count of the counter Z1 determined during the previous distance-pulse interval remains stored, so that it can be read by the computer during the whole time that the counter Z2 is counting. The counter Z1 can be reset either by the computer immediately after read-out of the count or, as shown in FIG. 2e, upon switch-over of the NOR gates UG1 and UG2 by the next distance pulse. Conversely, the count of the counter Z2 remains stored during the pulse interval in which count pulses are applied to the counter Z1.

Since the number of count pulses has already been adjusted to compensate for possible changes in the wheel diameter, speed can now be calculated using a preset wheel diameter. It is not necessary to enter the instantaneous wheel diameter again. Distance is determined by integrating the calculated speed over time. If distance were measured simply by counting the distance pulses, the result would be inaccurate, because wheel wear would not be taken into account.

By means of the divider T2, the distance-pulse interval and, thus, the period can be doubled. This doubling must also be communicated to the computer evaluating the counts. The greater time basis increases measurement accuracy, since unavoidable digitization jumps between successive counts are no longer of such great consequence. In addition, distance-pulse generators with different distance increments (distance-pulse separation) can be adapted to the evaluation computer without additional circuitry.

I claim:

1. In a device for measuring distance travelled by and speed of a rail vehicle of the type comprising at least one wheel-coupled distance-pulse generator and one evaluating circuit which calculates the speed of and the distance travelled by the vehicle from elapsed time corresponding to a distance-pulse interval between two or more distance pulses taking account of different wheel diameters, the elapsed time being determined by counting out in a first counter clock pulses of high repetition rate reduced to diameters, the elapsed time being determined by counting out in a first counter clock pulses of high repetition rate reduced to count pulses of reduced repetition rate by means of a first divider having a preset division ratio, the improvement comprising:
   a coding switch connected to said first divider which changes the division ratio in accordance with an input identifying the change in a wheel diameter;
   a second counter independent of said first counter; and
   alternating means coupled between an output of the first divider and respective inputs of the first and second counters for alternately supplying each of said two counters with all the count pulses from said first divider arriving within a particular said distance-pulse interval.

2. A device for measuring the distance travelled by and the speed of a rail vehicle comprising:
   a source of clock pulses of high repetition rate;
   a first divider coupled to said source of high repetition rate clock pulses and having a preset division ratio to produce clock pulses having a reduced repetition rate;
   a coding switch connected to said first divider which changes the preset division ratio in accordance with an input identifying a change in a wheel diameter;
   at least one wheel-coupled distance-pulse generator;
   a first counter;
   a second counter independent of said first counter;
   alternating means response to distance pulses from the distance-pulse generator for alternately supplying each of said two counters with all count pulses from said first divider arriving within successive predetermined distance-pulse intervals each corresponding to a predetermined number of distance pulses;
   an evaluating circuit which calculates the speed of and the distance travelled by the vehicle during the distance-time interval immediately prior to the current predetermined distance from the number of clock pulses of reduced repetition rate counted by the counter that was supplied by count pulses during such immediately prior distance-time interval;
   synchronizing means for synchronizing the clock pulses of reduced repetition rate with said distance pulses; and
   selection means responsive to the synchronizing means for coupling the output of the first divider to a particular one of said first counter and said second counter in response to a signal applied to a control input of the selection means.

3. A device as claimed in claim 2, further comprising:
   an additional divider coupled between an output of said synchronizing means and the control input of said selection means.

4. A device as claimed in claim 3, wherein said additional divider has an adjustable division ratio.

* * * * *